May 28, 1929. M. CASTRICUM 1,714,848
APPARATUS FOR INCORPORATING CORDS IN RUBBER SHEETS
Filed Dec. 7, 1922
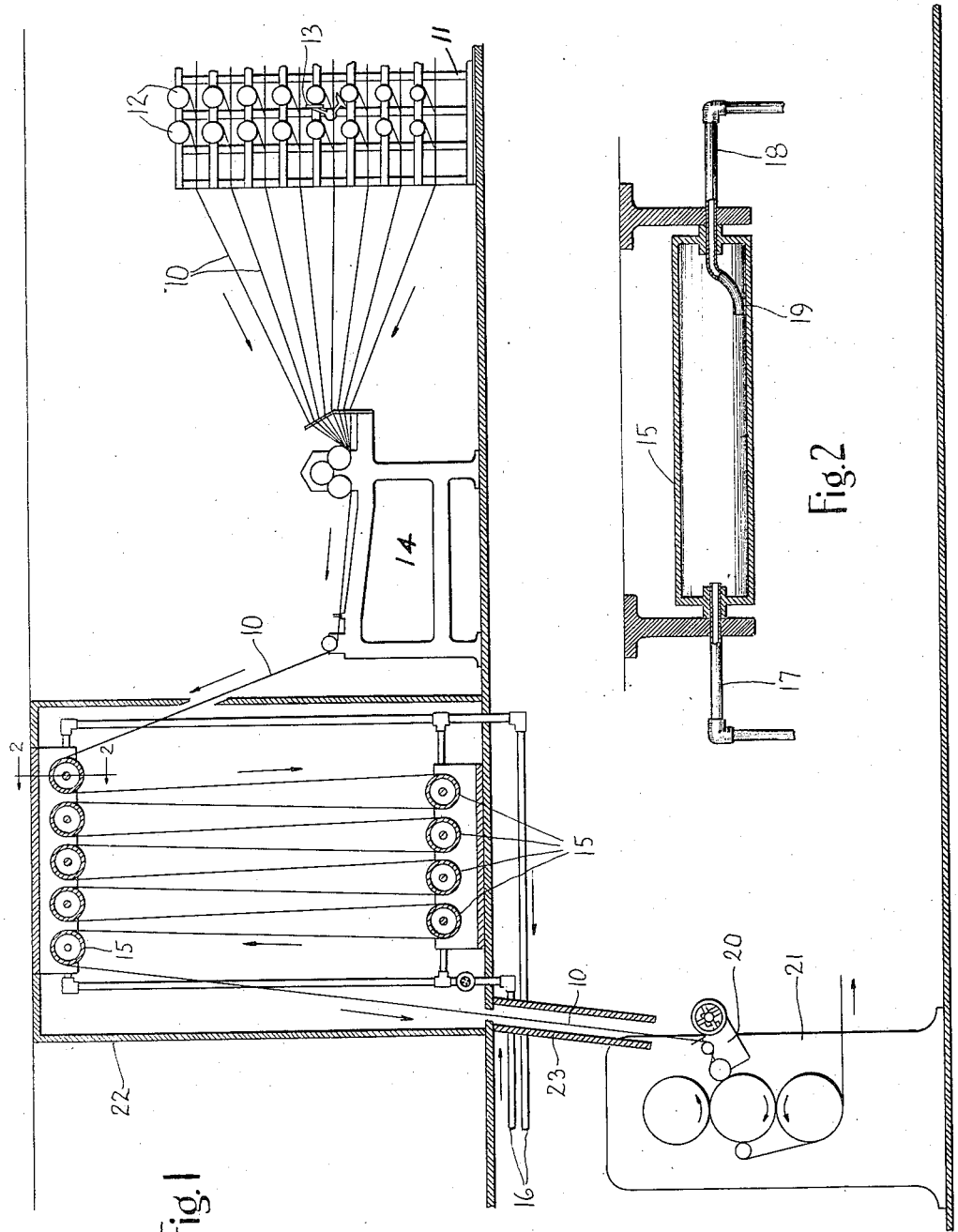
INVENTOR
Martin Castricum
BY
ATTORNEY Patented May 28, 1929.

1,714,848

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR INCORPORATING CORDS IN RUBBER SHEETS.

Application filed December 7, 1922. Serial No. 605,354.

The present invention relates to the incorporation of cords in rubber sheets, and particularly to the manufacture of what is commonly known as weftless cord fabric, a product used in the manufacture of pneumatic tires. It has for its object the provision of improved apparatus for equalizing the tension on the cords, and for presenting them to the rubber sheet in properly heated condition to insure a firm union.

The invention will be described with particular reference to the accompanying drawings, in which Fig. 1 is a diagrammatic view of an apparatus constructed according to my invention, and Fig. 2 is a sectional detail of a heating and equalizing roll.

It has been previously proposed to present a series of parallel cords to a rubber sheet freshly formed on a calender, and to heat them just prior to such contact by passing them over steam heated rolls. Two different constructions having this general characteristic are shown in my Patents 1,544,217 and 1,500,232. In the latter of these patents the cords, which were supplied on a creel such as is used in warp-handling machinery, were led through aligning devices to a set of equalizing rolls, over which the cords passed to give them opportunity to equalize their individual tensions. From these equalizing rolls the cords passed over a series of heated rolls and thence to the guiding device which brought them in proper relation with the rubber sheet.

I have now found that improved results can be obtained by combining the functions of heating and equalizing in a single unit from which the cords pass directly to the rubber-working calender. Where the heating and equalizing functions are performed by separate units the full combined effect of both is not realized. If the heating is done before the cords reach the equalizing rolls the time of travel through the latter allows the cords to cool. If the heating is done after the cords have passed the equalizing rolls the friction of the cords on the heating rolls prevents effective equalization of uneven tension conditions arising at the calender. By combining the two functions in a single unit the full effect of both is present when the cords meet the rubber.

I will now describe the preferred embodiment of the invention with particular reference to the drawings. I have there shown the cords 10 as being supplied on a creel 11, consisting of a plurality of cord tubes 12 each provided with a tension device 13 (one only being shown). From the creel the cords pass to an aligning device indicated as an entirety by 14, and thence to a series of freely rotatable metallic rolls 15 arranged in two sets in staggered relation, there being preferably a space of several feet between the sets. Steam is supplied to both sets through pipes 16. The rolls are hollow, as shown in Fig. 2, and are mounted to receive inlet nipples 17 and exhaust nipples 18 connected to the pipes 16. The exhaust nipples preferably dip to points adjacent the bottom inner surface of the rolls, as indicated at 19, so that the condensed steam will be blown out. From the steam rolls the cords pass to suitable guiding devices 20 mounted adjacent a rubber-working calender 21.

With the described arrangement the cords are delivered to the calender in hot condition from the last heating roll. The surface contact with the hot metal of the rolls heats the cords more quickly, and to a higher degree, than if they were merely passed through a hot chamber. Any inequality of tension arising from starting the cords through the calender, or from irregularities in the calender mechanism, will be quickly eliminated due to the relatively long cord path through the series of heating rolls, which permits the natural stretch of the cords to relieve any unequal tension; and due to the slippage of tensioned cord around the heated rolls, which are preferably made smooth surfaced for this purpose. Both functions occur unimpaired by each other, a result not attained by other constructions of which I am aware. In order to conserve the heat of the rolls, and avoid loss of heat from the cords, the rolls may be incased in an insulating box 22. As a further refinement, a heat insulated chute 23 may be provided to inclose the cords up to the time they reach the guiding devices 20,

Having thus described my invention, I claim:

An apparatus for directing a parallel series of unconnected cords to a rubber calender which comprises a series of heated rollers arranged in two widely separated sets over which the cords pass in zig-zag fashion, the last roll of the set being located sufficiently close to the calender so that the cords are received by the latter in hot condition, and the length of free cord path between the several heated rolls being sufficiently great so that the cords are equalized in tension at the same time that they are heated.

MARTIN CASTRICUM.